(12) United States Patent
Ishizuka et al.

(10) Patent No.: US 8,573,408 B2
(45) Date of Patent: Nov. 5, 2013

(54) CRYSTALLINE POLYMER MICROPOROUS MEMBRANE, METHOD FOR PRODUCING THE SAME, AND FILTRATION FILTER

(75) Inventors: Kenichi Ishizuka, Ashigarakami-gun (JP); Nobuhiro Nishita, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 500 days.

(21) Appl. No.: 12/829,861

(22) Filed: Jul. 2, 2010

(65) Prior Publication Data

US 2011/0000846 A1  Jan. 6, 2011

(30) Foreign Application Priority Data

Jul. 6, 2009 (JP) ................... 2009-160081

(51) Int. Cl.
*B01D 71/28* (2006.01)
*B01D 71/36* (2006.01)
*B01D 39/14* (2006.01)

(52) U.S. Cl.
USPC .................... 210/506; 210/500.21; 210/510.1

(58) Field of Classification Search
None
See application file for complete search history.

(56) References Cited

U.S. PATENT DOCUMENTS

| | | | |
|---|---|---|---|
| 1,421,341 A | 6/1922 | Zsigmonday et al. | |
| 2,783,894 A | 3/1957 | Lovell et al. | |
| 2,944,017 A | 7/1960 | Cotton | |
| 3,133,132 A | 5/1964 | Loeb et al. | |
| 3,408,315 A | 10/1968 | Paine et al. | |
| 4,196,070 A | 4/1980 | Chao et al. | |
| 4,340,479 A | 7/1982 | Pall | |
| 4,340,480 A | 7/1982 | Pall et al. | |
| 4,340,482 A | 7/1982 | Sternberg | |
| 4,450,126 A | 5/1984 | Kesting | |
| 4,454,085 A | 6/1984 | Schindler et al. | |
| 5,019,261 A | 5/1991 | Stengaard | |
| 5,091,086 A | 2/1992 | Stengaard | |
| 5,130,024 A * | 7/1992 | Fujimoto et al. | 210/500.36 |
| 5,503,746 A * | 4/1996 | Gagnon | 210/490 |
| 5,629,084 A | 5/1997 | Moya | |
| 6,177,011 B1 * | 1/2001 | Hachisuka et al. | 210/500.38 |
| 2007/0075013 A1 * | 4/2007 | Duong et al. | 210/500.36 |
| 2008/0245736 A1 | 10/2008 | Charkoudian | |
| 2009/0127187 A1 | 5/2009 | Hokazono et al. | |
| 2009/0159526 A1 | 6/2009 | Okada | |
| 2010/0051535 A1 | 3/2010 | Hokazono | |

FOREIGN PATENT DOCUMENTS

| | | |
|---|---|---|
| DE | 30 03 400 A1 | 8/1980 |
| DE | 3138525 A1 | 4/1983 |
| EP | 0257635 A2 | 3/1988 |
| EP | 1889653 A1 | 2/2008 |

(Continued)

OTHER PUBLICATIONS

Extended European Search Report dated Oct. 12, 2010 on European Application EP 10168083.3.

(Continued)

*Primary Examiner* — Katherine Zalasky
(74) *Attorney, Agent, or Firm* — Sughrue Mion, PLLC (57) ABSTRACT

A crystalline polymer microporous membrane, which contains: a microporous film formed of a crystalline polymer, which has a plurality of pores; and a hydrophilic polymer containing a hydroxyl group, which covers exposed surfaces of the microporous film, wherein the plurality of pores have a larger average pore diameter at a first surface of the film than the average pore diameter at a second surface of the film, and the average pore diameter of the pores continuously changes from the first surface to the second surface.

8 Claims, 3 Drawing Sheets

(56) References Cited

FOREIGN PATENT DOCUMENTS

| | | |
|---|---|---|
| EP | 2022556 A1 | 2/2009 |
| EP | 2163297 A1 | 3/2010 |
| GB | 2 041 821 A | 9/1980 |
| JP | 55-099934 A | 7/1980 |
| JP | 58-037842 A | 3/1983 |
| JP | 58-091732 A | 5/1983 |
| JP | 63-068646 A | 3/1988 |
| JP | 03-086206 A | 4/1991 |
| JP | 9-504994 A | 5/1997 |
| JP | 11-106553 A | 4/1999 |
| JP | 2007-100088 A | 4/2007 |
| JP | 2007-154153 A | 6/2007 |
| JP | 2007-332342 A | 12/2007 |
| JP | 2009-119412 A | 6/2009 |
| WO | 95/13858 A1 | 5/1995 |
| WO | 03/008078 A2 | 1/2003 |

OTHER PUBLICATIONS

Office Action dated Jul. 3, 2012 in Japanese Patent Application No. 2009-160081.

* cited by examiner

CRYSTALLINE POLYMER MICROPOROUS MEMBRANE, METHOD FOR PRODUCING THE SAME, AND FILTRATION FILTER

BACKGROUND OF THE INVENTION

1. Field of the Invention

The present invention relates to a crystalline polymer microporous membrane which has high filtration efficiency and is used for precise filtration of gases, liquids and the like, to a method for producing the crystalline polymer microporous membrane, and to a filtration filter.

2. Description of the Related Art

Microporous membranes have long since been known and widely used for filtration filters, etc. As such microporous membranes, there are, for example, a microporous membrane using cellulose ester as a material thereof (see U.S. Pat. Nos. 1,421,341, 3,133,132, and 2,944,017), a microporous membrane using aliphatic polyamide as a material thereof (see U.S. Pat. Nos. 2,783,894, 3,408,315, 4,340,479, 4,340,480, and 4,450,126, German Patent No. 3,138,525, Japanese Patent Application Laid-Open (JP-A) No. 58-37842), a microporous membrane using polyfluorocarbon as a material thereof (see U.S. Pat. Nos. 4,196,070, and 4,340,482, JP-A Nos. 55-99934, and 58-91732), a microporous membrane using polypropylene as a material thereof (see West German Patent No. 3,003,400), and the like.

These microporous membranes are used for filtration and sterilization of washing water for use in the electronics industries, water for medical use, water for pharmaceutical production processes and water for use in the food industry. In recent years, the applications of and amount for using microporous membranes have increased, and microporous membranes have attracted great attention because of their high reliability in trapping particles. Among these, microporous membranes made of crystalline polymers are superior in chemical resistance, and in particular, microporous membranes produced by using polytetrafluoroethylene (PTEF) as a raw material are superior in both heat resistance and chemical resistance. Therefore, demands for such microporous membranes have been rapidly growing.

Generally speaking, microporous membranes have a low filtration flow rate (i.e., a short lifetime) per unit area. In the case where the microporous membranes are used for industrial purposes, it is necessary to align many filtering units to increase the membrane areas. For this reason, a reduction in the cost for the filtering process is appreciated, and thus an extension of the filtering lifetime is desired. To this end, there are various proposals for a microporous membrane effective for preventing or slowing down reductions in flow rate due to clogging, such as an asymmetric membrane in which pore diameters are gradually reduced from the inlet side to the outlet side.

Moreover, another proposal is a microporous membrane of a crystalline polymer, which has a larger average pore diameter on a surface of the film than that on the back surface thereof, and has the pores whose average diameter continuously changes from the surface to the back surface (see JP-A No. 2007-332342). According to this proposal, fine particles are efficiently captured by the filter and the lifetime of the filter is improved, by performing filtration using, as the inlet side, the plane (i.e. the surface) having the larger average pore diameter.

However, there is still a problem such that no effective method has been proposed as a method for hydrophilizing a crystalline polymer microporous membrane having asymmetric pores.

The following are known as a hydrophilization method of a crystalline polymer microporous membrane: a hydrophilization method by applying an ultraviolet laser beam and ArF laser beam (for example, see JP-A No. 11-106553); and a hydrophilization method by performing a chemical etching using a sodium metal-naphthalene complex (for example JP-A No. 2007-154153). However, in the case of the crystalline polymer microporous membrane having an asymmetric pore structure, the membrane has a heated surface, unheated surface, and an inner part in between these surfaces, and the polymerization degree of the crystalline polymer varies in each area. The aforementioned hydrophilization methods cannot uniformly hydrophilize the entire membrane of such structure, and a hydrophilization process needs to be performed on each area separately depending on the polymerization degree thereof so as to uniformly hydrophilize the entire membrane, and the requirement for these separate hydrophilization processes results in low efficiency. Moreover, the membranes hydrophilized by these methods do not have sufficient hydrophilicity, and the filtration flow rate and lifetime thereof are also insufficient.

In addition, the hydrophilization method by applying an ultraviolet laser beam and ArF laser beam has a problem such that the radiation of the ultraviolet laser beam and ArF laser beam may damage the membrane, and thus the strength of the membrane may be decreased.

Also known is a method for improving hydrophilicity of a porous sheet formed of a fluororesin by covering the porous sheet with a water-insoluble hydrophilic material (for example, see JP-A No. 03-86206).

However, this method cannot improve the filtration flow rate and lifetime of the porous sheet formed of the fluororesin.

BRIEF SUMMARY OF THE INVENTION

The present invention aims at solving the aforementioned various problems in the art, and achieving the following object. An object of the present invention is to provide a crystalline polymer microporous membrane having high hydrophilicity, long lifetime as a filter, and excellent filtration flow rate, to provide a method for producing a crystalline polymer microporous membrane, which can efficiently produce the aforementioned crystalline polymer microporous membrane, and to provide a filtration filter using the aforementioned crystalline polymer microporous membrane.

Means for solving the aforementioned problems are as follows:

<1> A crystalline polymer microporous membrane, containing:
a microporous film formed of a crystalline polymer, which has a plurality of pores; and
a hydrophilic polymer containing a hydroxyl group, which covers exposed surfaces of the microporous film,
wherein the plurality of pores have a larger average pore diameter at a first surface of the film than the average pore diameter at a second surface of the film, and the average pore diameter of the pores continuously changes from the first surface to the second surface.

<2> The crystalline polymer microporous membrane according to <1>, wherein the hydrophilic polymer is crosslinked with a crosslinking agent.

<3> The crystalline polymer microporous membrane according to any of <1> or <2>, wherein the microporous film is a film obtained by heating a first surface of a film formed of a crystalline polymer so as to form a semi-baked film with a temperature gradient in the thickness direction thereof, and drawing the semi-baked film.

<4> The crystalline polymer microporous membrane according to <3>, wherein the second surface is a heated surface.

<5> The crystalline polymer microporous membrane according to any one of <1> to <4>, wherein the crystalline polymer is polytetrafluoroethylene.

<6> The crystalline polymer microporous membrane according to any one of <1> to <5>, wherein the hydrophilic polymer containing a hydroxyl group is polyvinyl alcohol.

<7> The crystalline polymer microporous membrane according to any one of <2> to <6>, wherein the crosslinking agent is a polyfunctional epoxy compound.

<8> A method for producing a crystalline polymer microporous membrane, containing:
heating a first surface of a film formed of a crystalline polymer so as to form a semi-baked film with a temperature gradient in the thickness direction thereof;
drawing the semi-baked film; and
covering the drawn semi-baked film with a hydrophilic polymer.

<9> The method for producing a crystalline polymer microporous membrane according to <8>, wherein the covering contains crosslinking the hydrophilic polymer with a crosslinking agent.

<10> The method for producing a crystalline polymer microporous membrane according to any of <8> or <9>, wherein the crystalline polymer is polytetrafluoroethylene.

<11> The method for producing a crystalline polymer microporous membrane according to any one of <8> to <10>, wherein the drawing is drawing the semi-baked film in a uniaxial direction.

<12> The method for producing a crystalline polymer microporous membrane according to any one of <8> to <10>, wherein the drawing is drawing the semi-baked film in a biaxial direction.

<13> The method for producing a crystalline polymer microporous membrane according to any one of <8> to <12>, wherein the hydrophilic polymer is polyvinyl alcohol.

<14> The method for producing a crystalline polymer microporous membrane according to any one of <9> to <13>, wherein the crosslinking agent is a polyfunctional epoxy compound.

<15> A filtration filter, containing:
the crystalline polymer microporous membrane as defined any one of <1> to <7>.

<16> The filtration filter according to <15>, wherein the crystalline polymer microporous membrane has a pleated shape.

<17> The filtration filter according to any of <15> or <16>, wherein the first surface of the microporous film is a filtering surface from which a fluid to be filtered is introduced.

The present invention solves the aforementioned various problems in the art, achieves the aforementioned object, and can provide: a crystalline polymer microporous membrane having high hydrophilicity, long lifetime as a filter, and excellent filtration flow rate; a method for producing a crystalline polymer microporous membrane, which can efficiently produce the aforementioned crystalline polymer microporous membrane; and a filtration filter using the aforementioned crystalline polymer microporous membrane.

DETAILED DESCRIPTION OF THE INVENTION (Crystalline Polymer Microporous Membrane and Method for Producing Crystalline Polymer Microporous Membrane)

A crystalline polymer microporous membrane contains a microporous membrane formed of a crystalline polymer, which has a plurality of pores; and a hydrophilic polymer containing a hydroxyl group, which covers exposed surfaces of the crystalline polymer microporous membrane, in which the plurality of pores have a larger average pore diameter at a first surface of the film, and a smaller average pore diameter at a second surface of the film, and the average pore diameter of the pores continuously changes from the first surface to the second surface.

A method for producing a crystalline polymer microporous membrane contains a hydrophilic polymer coating step, drawing step, and hydrophilization step, and may further contain a crystalline polymer film forming step and other steps, if necessary.

The crystalline polymer microporous membrane and the method for producing the same will be specifically explained hereinafter.

The crystalline polymer microporous membrane is obtained by heating the first surface of the film formed of the crystalline polymer to form a semi-baked film with a temperature gradient in the film thickness direction, drawing the semi-baked film, and hydrophilizing the drawn film.

In this case, it is preferred that heating be performed from the side of "the second surface" having the smaller average pore diameter than that on "first surface." The pore is a continuous pore (i.e. a pore both ends of which are open) from the first surface to the second surface.

The "first surface" having the larger average pore diameter may be referred to as "unheated surface," and "the second surface" having the smaller average pore diameter may be referred to as "the heated surface" in the descriptions below for simplicity of explanation. However, semi-baking may be performed on either surface of an unbaked crystalline polymer film, and thus either surface thereof may become "the heated surface."

-Crystalline Polymer-

In the present specification, the term "crystalline polymer" means a polymer having a molecular structure in which crystalline regions containing regularly-aligned long-chain molecules are mixed with amorphous regions having not regularly aligned long-chain molecules. Such polymer exhibits crystallinity through a physical treatment. For example, if a polyethylene film is drawn by an external force, a phenomenon is observed in which the initially transparent film turns to the clouded film in white. This phenomenon is derived from the expression of crystallinity which is obtained when the molecular alignment in the polymer is aligned in one direction by the external force.

The crystalline polymer is suitably selected depending on the intended purpose without any restriction. Examples thereof include polyalkylenes, polyesters, polyamides, polyethers, and liquid crystalline polymers. Specific examples thereof include polyethylenes, polypropylenes, nylons, polyacetals, polybutylene terephthalates, polyethylene terephthalates, syndiotactic polystyrenes, polyphenylene sulfides, polyether-etherketones, wholly aromatic polyamides, wholly aromatic polyesters, fluororesins, and polyethernitriles.

Among them, polyalkylene (e.g. polyethylene and polypropylene) is preferable, fluoropolyalkylenes in which a hydrogen atom of the alkylene group in polyalkylene is partially or wholly substituted with a fluorine atom are more preferable, and polytetrafluoroethylenes (PTFE) are particularly preferable, as they have desirable chemical resistance and handling properties.

Polyethylenes vary in their densities depending on the branching degrees thereof and are classified into low-density polyethylenes (LDPE) that have high branching degrees and are low in crystallinity, and high-density polyethylenes (HDPE) that have low branching degrees and are high in crystallinity. Both LDPE and HDPE can be used. Among these, HDPE is particularly preferable in terms of the crystallinity control.

The crystalline polymer preferably has a glass transition temperature of 40° C. to 400° C., more preferably 50° C. to 350° C. The crystalline polymer preferably has a mass average molecular weight of 1,000 to 100,000,000. The crystalline polymer preferably has a number average molecular weight of 500 to 50,000,000, more preferably 1,000 to 10,000,000.

One of characteristics of the crystalline polymer microporous membrane is that the average pore diameter at the unheated surface of the membrane is larger than the average pore diameter at the heated surface of the membrane.

When the membrane is assumed to have a thickness of 10, an average pore diameter is P1 at a depth of 1 from the surface, an average pore diameter is P2 at a depth of 9 from the surface, and the ratio P1/P2 is preferably 2 to 10,000, more preferably 3 to 100.

In addition, the crystalline polymer microporous membrane has a ratio (an average pore diameter at the unheated surface/an average pore diameter at the heated surface) of 5/1 to 30/1, more preferably 10/1 to 25/1, and even more preferably 15/1 to 20/1.

The average pore diameter is, for example, measured as follows: a surface of the membrane is photographed (SEM photograph with a magnification of 1,000 to 5,000) using a scanning electron microscope (HITACHI S-4000, and HITACHI E1030 (for vapor deposition), both manufactured by Hitachi, Ltd.), the photograph is taken into an image processing apparatus (Name of main body: TV IMAGE PROCESSOR TVIP-4100II, manufactured by Nippon Avionics Co., Ltd., Name of control software: TV IMAGE PROCESSOR IMAGE COMMAND 4198, manufactured by Ratoc System Engineering Co., Ltd.) so as to obtain an image only including crystalline polymer fibers, and the average pore diameter is calculated by arithmetically processing the image.

The crystalline polymer microporous membrane of the present invention includes both an (first) aspect in which the average pore diameter continuously changes from the unheated surface thereof towards the heated surface thereof, and an (second) aspect in which the membrane has a single-layer structure. Addition of these aspects makes it possible to lengthen the filtration lifetime effectively.

The phrase "the average pore diameter continuously changes from the unheated surface thereof towards the heated surface thereof" used in the first aspect means that when the distance (d) from the unheated surface in the thickness direction (which is equivalent to the depth from the first surface) is plotted on the horizontal axis on a graph, and the average pore diameter (D) is plotted on the vertical axis on the graph, the graph is represented by one continuous line. The graph concerning the area between the unheated surface (d=0) and the heated surface (d=membrane thickness) may be composed only of regions where the inclination is negative (dD/dt<0), or may be composed of regions where the inclination is negative and regions where the inclination is zero (dD/dt=0), or may be composed of regions where the inclination is negative and regions where the inclination is positive (dD/dt>0). It is desirable that the graph be composed only of regions where the inclination is negative (dD/dt<0), or composed of regions where the inclination is negative and regions where the inclination is zero (dD/dt=0). It is particularly desirable that the graph be composed only of regions where the inclination is negative (dD/dt<0).

The regions where the inclination is negative preferably include at least the unheated surface of the membrane. In the regions where the inclination is negative (dD/dt<0), the inclination may be constant or vary. For instance, when the graph concerning the crystalline polymer microporous membrane of the present invention is composed only of regions where the inclination is negative (dD/dt<0), it is possible to employ an aspect in which dD/dt at the heated surface of the membrane is greater than dD/dt at the unheated surface of the membrane. Also, it is possible to employ an aspect in which dD/dt gradually increases from the unheated surface of the membrane towards the heated surface of the membrane (an aspect in which the absolute value thereof decreases).

The term "single-layer structure" used in the second aspect excludes multilayer structures which are each formed, for example, by sticking together or depositing two or more layers. In other words, the term "single-layer structure" used in the second aspect means a structure having no border between layers that exists in a multilayer structure. In the second aspect, it is preferred that the membrane have a plane, where the average pore diameter is smaller than that at the unheated surface and larger than that at the heated surface, inside the membrane.

The crystalline polymer microporous membrane of the present invention preferably includes both the characteristics of the first and second aspects. Specifically, the microporous membrane is preferably such that the average pore diameter at the unheated surface of the membrane is larger than the average pore diameter at the heated surface of the membrane, the average pore diameter continuously changes from the unheated surface towards the heated surface, and the membrane has a single-layer structure. Configuration in such a manner makes it possible for the microporous membrane to trap fine particles highly efficiently when a solution or the like is passed for filtration from the side of the surface with the larger average pore diameter, enables its filtration lifetime to lengthen greatly and can be produced easily at low cost.

A thickness of the crystalline polymer microporous membrane is preferably 1 µm to 300 µm, more preferably 5 µm to 100 µm, and even more preferably 10 µm to 80 µm.

-Hydrophilic Polymer-

The hydrophilic polymer is suitably selected depending on the intended purpose without any restriction, provided that the polymer contains hydroxyl groups. Examples thereof include: polyvinyl alcohol (PVA); polysaccharide such as agarose, dextran, chitosan, and cellulose, and derivatives thereof; and gelatin. These may be used independently, or in combination. Among them, polyvinyl alcohol (PVA) is preferable.

A saponification value of polyvinyl alcohol is suitably selected depending on the intended purpose without any restriction, but is preferably 50 to 100, more preferably 60 to 100. When the saponification value of polyvinyl alcohol is less than 50, hydrophilic properties thereof may be insufficient.

A molecular weight of polyvinyl alcohol is suitably selected depending on the intended purpose without any restriction, but is preferably 200 to 150,000, more preferably 500 to 100,000.

When the molecular weight of polyvinyl alcohol is less than 200, polyvinyl alcohol cannot be fixed on a microporous membrane, not being able to provide hydrophilicity to the microporous membrane. When the molecular weight of polyvinyl alcohol is more than 150,000, polyvinyl alcohol does not penetrate into a microporous membrane, not being able to provide hydrophilicity to the inner portion of the microporous membrane.

A method for covering the crystalline polymer microporous membrane with the hydrophilic polymer is suitably selected depending on the intended purpose without any restriction. For example, there is a method in which a formulated liquid including the hydrophilic polymer is applied to the crystalline polymer microporous membrane by immersing or coating, so as to cover the crystalline polymer microporous membrane with the hydrophilic polymer.

A concentration of polyvinyl alcohol in the formulated liquid is suitably selected depending on the intended purpose without any restriction, but is preferably 0.001% by mass to 20% by mass, more preferably 0.002% by mass to 15% by mass, and even more preferably 0.003% by mass to 10% by mass.

When the concentration of polyvinyl alcohol is less than 0.001% by mass, the entire crystalline polymer microporous membrane may not have hydrophilicity. When the concentration thereof is more than 20% by mass, polyvinyl alcohol may fill some of pours of the crystalline polymer microporous membrane, which decreases a filtration flow rate thereof.

Examples of commercial polyvinyl alcohol include RS2117 (Mw: 74,800), PVA103 (Mw: 13,200, saponification value: 98 to 99), PVA-HC (saponification value: 99.85 or more), PVA-205C (Mw: 22,000, high purity, saponification value: 87 to 89), M-205 (Mw: 22,000, saponification value: 87 to 89), and M-115 (Mw: 66,000, saponification value: 97 to 98), all manufactured by Kuraray Co., Ltd.

The hydrophilic polymer present in the crystalline polymer microporous membrane can be confirmed by extracting the substances of the membrane in a solvent such as methanol, water and DMF, and measuring and analyzing the extracted substance by NMR, IR, or the like.

In the case where the substances cannot be extracted in the solvent, the presence of the hydrophilic polymer can be confirmed by finely cutting the crystalline polymer microporous membrane, mixed with KBr, then measuring and analyzing by IR. Alternatively, it can be confirmed by decomposing all the polymers contained in the crystalline polymer microporous membrane using supercritical methanol, and measuring and analyzing the decomposed components by MASS, NMR, IR, or the like.

—Crosslinking Agent—

The hydrophilic polymer is preferably crosslinked using a crosslinking agent. Such crosslinkages improve the durability of the crystalline polymer microporous membrane.

The crosslinking agent is suitably selected depending on the intended purpose without any restriction. Examples thereof include an epoxy compound, an isocyanate compound, an aldehyde compound, a UV-crosslinkable compound, a leaving group-containing compound, a carboxylic acid compound, and a urea compound. Among them, the epoxy compound is preferable. When the epoxy compound is used as the crosslinking agent, the formed crosslinkages including ether bondings provide the crystalline polymer microporous membrane with acid resistance and alkali resistance.

The epoxy compound is suitably selected depending on the intended purpose without any restriction. Examples thereof include: monoglycidyl ethers and polyglycidyl ethers, such as ethyleneglycol diglycidyl ether, and polyethylene glycol diglycidyl ether; glycerol derivatives; pentaerythritol derivatives; sorbitol derivatives; and isocyanurate derivatives. Examples of the commercially available epoxy compound include: ethyleneglycol diglycidyl ether and triglycidyl ether isocyanate (manufactured by TOKYO CHEMICAL INDUSTRY CO., LTD.); EPIOL E400 (manufactured by NOF Corporation); and DENACOL EX313, DENACOL EX411, and DENACOL EX614B (manufactured by Nagase ChemteX Corporation).

The isocyanate compound is suitably selected depending on the intended purpose without any restriction. Examples thereof include: aromatic isocyanate such as tolylene diisocyanate, naphthalene diisocyanate, tolidine diisocyanate, xylene diisocyanate, diphenylmethane diisocyanate, and triphenylmethane diisocyanate; aliphatic isocyanate such as hexamethylene diisocyanate, hexamethylene triisocyanate, and lysine ester triisocyanate; and alicyclic isocyanate such as isophorone diisocyanate.

The UV crosslinkable compound is suitably selected depending on the intended purpose without any restriction. Examples thereof include a vinyl group-containing compound, an acrylate group-containing compound, and a methacrylate group-containing compound. Specific examples thereof include paravinyl phenol, methyl acrylate, acrylic acid, methyl methacrylate, and methacrylic acid.

The leaving group-containing compound is suitably selected depending on the intended purpose without any restriction. Examples thereof include tetraethyleneglycol ditosylate, and chlorotriazine.

The crosslinked state of the crystalline polymer microporous membrane can be confirmed by extracting in a solvent such as methanol, water, and DMF, and measuring and analyzing the extracted substance by NMR, IR, or the like.

It is also confirmed by measuring and analyzing bonds generated during a crosslinking reaction by IR, NMR, or the like.

<Method for Producing Crystalline Polymer Microporous Membrane>

The method for producing a crystalline polymer microporous membrane contains at least a semi-baked film forming step, drawing step, and hydrophilic polymer covering step, and may further contain a crystalline polymer film forming step and other steps, if necessary.

—Crystalline Polymer Film Forming Step—

A starting material used for forming a semi-baked crystalline film formed of a crystalline polymer is suitably selected from those crystalline polymers mentioned above without any restriction. Among them, polyethylene, or a polycrystalline polymer in which hydrogen atoms of polyethylene are replaced with fluorine atoms is suitably used, and polytetrafluoroethylene (PTFE) is particularly preferably used.

The crystalline polymer used as the starting material preferably has a number average molecular weight of 500 to 50,000,000, more preferably 1,000 to 10,000,000.

The crystalline polymer used as the starting material is preferably polyethylene, such as polytetrafluoroethylene. As polytetrafluoroethylene, those produced by emulsification polymerization can be used. Preferably, fine polytetrafluoroethylene powder obtained by coagulating aqueous dispersed elements obtained from the emulsification polymerization is used.

Polytetrafluoroethylene used as the starting material preferably has a number average molecular weight of 2,500,000 to 10,000,000, more preferably 3,000,000 to 8,000,000.

A starting material of polytetrafluoroethylene is suitably selected from those known in the art without any restriction, and can be selected from the commercially available starting materials thereof. Preferable examples of the commercial product thereof include POLYFLON fine powder F104U, manufactured by DAIKIN INDUSTRIES, LTD.

It is preferred that a film be prepared by mixing the starting material of polytetrafluoroethylene and an extrusion aid, subjecting the mixture to paste extrusion and drawing the mixture under pressure. The extrusion aid is preferably a liquid lubricant, and specific examples thereof include solvent naphtha and white oil. A commercially available product may be used as the extrusion aid, for example a hydrocarbon oil such as ISOPAR produced by Esso Sekiyu K. K. The amount of the extrusion aid to be added is preferably in the range of 20 parts by mass to 30 parts by mass relative to 100 parts by mass of the crystalline polymer.

In general, the paste extrusion is preferably carried out at a temperature of 50° C. to 80° C. The shape into which the mixture is extruded is suitably selected depending on the intended purpose without any restriction, but the mixture is preferably extruded into a rod. The extruded matter is subsequently drawn into a film under pressure. The drawing under pressure may, for example, be performed by calendering at a rate of 50 m/min, using a calender roll. The temperature at which the drawing under pressure is performed is generally set at 50° C. to 70° C.

Thereafter, the film is preferably heated so as to remove the extrusion aid and thus to form an unbaked crystalline polymer film. The heating temperature at this time is suitably set depending on the crystalline polymer for use, but is preferably 40° C. to 400° C., more preferably 60° C. to 350° C. When polytetrafluoroethylene is used as the crystalline polymer, for example, the heating temperature is preferably 150° C. to 280° C., more preferably 200° C. to 255° C.

The heating may be performed, for example, by placing the film in a hot-air drying oven. The thickness of the unbaked crystalline polymer film thus produced may be suitably adjusted depending on the thickness of the crystalline polymer microporous membrane to be produced as a final product, and it is also necessary to adjust the thickness under the consideration of reduction in thickness caused by drawing in a subsequent step.

For the production of the crystalline polymer unheated film, the descriptions in "Polyflon Handbook" (published by DAIKIN INDUSTRIES, LTD, Revised Edition of the year 1983) may be suitably used as a reference, and applied.

—Semi-Baked Film Forming Step—

The semi-baked film forming step is heating a first surface of a film formed of the crystalline polymer with a temperature gradient in the film thickness direction so as to form a semi-baked film.

Here, the term "semi-baked" means that the crystalline polymer is heated at a temperature equal to or higher than the melting point of the baked crystalline polymer, and equal to or lower than the melting point of the unbaked crystalline polymer plus 15° C.

Moreover, the term "unbaked crystalline polymer" means a crystalline polymer which has not been heated for baking, and the term "the melting point of the crystalline polymer" means a peak temperature on an endothermic curve which is formed when the calorific value of the unbaked crystalline polymer is measured by a differential scanning calorimeter. The melting points of the baked and unbaked crystalline polymers vary depending on the crystalline polymer for use or an average molecular weight thereof, but are preferably 50° C. to 450° C., more preferably 80° C. to 400° C.

The selection of such temperature range is based upon the following. In the case of polytetrafluoroethylene, for example, the melting point of baked polytetrafluoroethylene is approximately 324° C. and the melting point of unbaked polytetrafluoroethylene is approximately 345° C. Accordingly, to produce a semi-baked film from the polytetrafluoroethylene film, the film is preferably heated at a temperature of 327° C. to 360° C., more preferably 335° C. to 350° C., and for example at 345° C. The semi-baked film is in the state where a film having a melting point of approximately 324° C. coexists with a film having a melting point of approximately 345° C.

The semi-baked film is produced by heating the first surface of the film formed of a crystalline polymer. This makes it possible to control the heating temperature in an asymmetrical manner in the thickness direction and to produce a crystalline polymer microporous membrane easily.

In this case, it is preferred that the second surface having the average pore diameter smaller than that of the first surface be a heated surface.

As for the temperature gradient in the thickness direction of the film, the temperature difference between the front surface and back surface of the film is preferably 30° C. or more, more preferably 50° C. or more.

The method of heating the film is selected from the various methods, such as a method of blowing hot air to the crystalline polymer film, a method of bringing the crystalline polymer film into contact with a heat medium, a method of bringing the crystalline polymer film into contact with a heated member, a method of irradiating the crystalline polymer film with an infrared ray and a method of irradiating the crystalline polymer film with an electromagnetic wave. Although the method of heating the film can be selected without any restriction, the method of bringing the crystalline polymer film into contact with a heated medium and the method of irradiating the crystalline polymer film with an infrared ray are particularly preferable. As the heated member, a heating roller is particularly preferable. Use of the heating roller makes it possible to continuously perform semi-baking in an assembly-line operation in an industrial manner and makes it easier to control the temperature and maintain the apparatus. The temperature of the heating roller can be set at the temperature for performing the semi-baking. The duration for the contact between the heating roller and the film may be long enough to sufficiently perform the intended semi-baking, and is generally 30 seconds to 120 seconds, preferably 45 seconds to 90 seconds, and even more preferably 60 seconds to 80 seconds.

The method of the infrared ray irradiation is suitably selected from those known in the art without any restriction.

For the general definition of the infrared ray, "Infrared Ray in Practical Use" (published by Ningentorekishisha in 1992) may be referred to. Here, the infrared ray means an electromagnetic wave having a wavelength of 0.74 µm to 1,000 µm. Within this range, an electromagnetic wave having a wavelength of 0.74 µm to 3 µm is defined as a near-infrared ray, and an electromagnetic wave having a wavelength of 3 µm to 1,000 µm is defined as a far-infrared ray.

Since the temperature difference between the front surface and the back surface of the unheated film is preferably large, it is desirable to use a far-infrared ray that is advantageous for heating the front surface.

A device for applying the infrared ray is suitably selected depending on the intended purpose without any restriction, provided that it can apply an infrared ray having a desired wavelength. Generally, an electric bulb (halogen lamp) is used as a device for applying the near-infrared ray, while a heating element such as a metal oxidized surface, quartz or ceramic is used as a device for applying the far-infrared ray.

Also, infrared irradiation enables the film to be continuously semi-baked in an assembly-line operation in an industrial manner and makes it easier to control the temperature and maintain the device. Moreover, since the infrared irradiation is performed in a noncontact manner, it is clean and does not allow defects such as pilling to arise.

The temperature of the film surface when irradiated with the infrared ray can be controlled by the output of the infrared irradiation device, the distance between the infrared irradiation device and the film surface, the irradiation time (conveyance speed) and/or the atmospheric temperature, and may be adjusted to the temperature at which the film is semi-baked. The temperature is preferably 327° C. to 380° C., more preferably 335° C. to 360° C. When the temperature is lower than 327° C., the crystallized state may not change and thus the pore diameter may not be able to be controlled. When the temperature is higher than 380° C., the entire film may melt, thus possibly causing extreme deformation or thermal decomposition of the polymer.

The duration for the infrared irradiation is suitably adjusted depending on the intended purpose without any restriction, but is long enough to perform sufficient semi-baking, preferably 30 seconds to 120 seconds, more preferably 45 seconds to 90 seconds, and even more preferably 60 seconds to 80 seconds.

The heating in the semi-baked film forming step may be carried out continuously or intermittently.

In the case where the first surface of the film is continuously heated, it is preferable to simultaneously perform heating of the first surface and cooling of the second surface of the film to maintain the temperature gradient of the film between the first surface and second surface.

The method of cooling the second surface is suitably selected depending on the intended purpose without any restriction. Examples thereof include a method of blowing cold air, a method of bringing the second surface into contact with a cooling medium, a method of bringing the second surface into contact with a cooled material and a method of cooling the second surface by cooling in air. It is preferred that the cooling be performed by bringing the unheated surface into contact with the cooled material. A cooling roller is particularly preferable as the cooled material. Use of the cooling roller makes it possible to continuously perform semi-baking in an assembly-line operation in an industrial manner and makes it easier to control the temperature and maintain the apparatus. The temperature of the cooling roller can be set so as to generate a difference to the temperature for performing the semi-baking. The duration for the contact between the cooling roller and the semi-baked film may be long enough to sufficiently perform the intended semi-baking, and considering the fact that it is performed at the same time as heating, is generally 30 seconds to 120 seconds, preferably 45 seconds to 90 seconds, and even more preferably 60 seconds to 80 seconds.

The surface material of the heating roller and cooling roller is generally stainless steel that is excellent in durability, particularly preferably SUS316. In the method for producing a crystalline polymer microporous membrane, it is also a preferable embodiment that the unheated surface of the film is brought into contact with a heating and cooling roller. Also, the heated surface of the film may be brought into contact with a roller having the temperature lower than the heating and cooling roller. For example, a roller maintaining ambient temperature may be brought into contact with and press the film from the heating surface of the film so as to make the film closely fit to the heating roller. Moreover, the heated surface of the film may be brought into contact with a guide roller before or after the contact with the heating roller.

Meanwhile, in the case where the heating in the semi-baked film forming step is carried out intermittently, it is preferable to heat or cool the second surface of the film intermittently so as to restrain increase in the temperature of the first surface.

—Drawing Step—

The semi-baked film is drawn after the semi-baking. The drawing is preferably performed in the both the length direction and width direction. The film may be drawn in the length direction, followed by drawn in the width direction, or may be drawn in the biaxial direction at the same time.

In the case where the film is sequentially drawn in the length direction and width direction, it is preferred that the film be drawn in the length direction first, then be drawn in the width direction.

The extension rate of the film in the length direction is preferably 4 times to 100 times, more preferably 8 times to 90 times, and even more preferably 10 times to 80 times. The temperature for the drawing in the length direction is preferably 100° C. to 300° C., more preferably 200° C. to 290° C., and even more preferably 250° C. to 280° C.

The extension rate of the film in the width direction is preferably 10 times to 100 times, more preferably 12 times to 90 times, even more preferably 15 times to 70 times, and particularly preferably 20 times to 40 times. The temperature for the drawing in the width direction is preferably 100° C. to 300° C., more preferably 200° C. to 290° C., and even more preferably 250° C. to 280° C.

The extension rate of the film in terms of the area thereof is preferably 50 times to 300 times, more preferably 75 times 280 times, and even more preferably 100 times to 260 times. Before the drawing is performed on the film, the film may be pre-heated at the temperature equal to or lower than the temperature for the drawing.

Heat curing may be performed, if necessary, after the drawing. The temperature for the heat curing is generally equal to or higher than the temperature for the drawing, but is lower than the melting point of the baked crystalline polymer.

-Hydrophilic Polymer Covering Step-

The hydrophilic polymer covering step is covering the drawn semi-baked film with a hydrophilic polymer.

Examples of a method for carrying out this step include: a method in which the semi-baked film (i.e. the microporous membrane formed of the crystalline polymer) is immersed in a formulated liquid including a hydrophilic polymer; and a method in which the semi-baked film (i.e. the microporous membrane formed of the crystalline polymer) is coated with a formulated liquid including a hydrophilic polymer.

The method for producing a crystalline polymer microporous membrane including this hydrophilic polymer covering step enables to make the film hydrophilic without complicated processes such as UV laser or ArF laser irradiation, and chemical etching, and thus can efficiently produce a hydrophilic crystalline polymer microporous membrane. In addition, such method can produce a crystalline polymer microporous membrane having excellent properties, in terms of hydrophilicity, filtration flow rate, and filtration lifetime.

A solvent used for forming the formulated liquid including the hydrophilic polymer is suitably selected depending on the intended purpose without any restriction. Examples thereof include: water; alcohols such as methanol, ethanol, isopropanol, ethylene glycol; ketones such as acetone, and methylethyl ketone; ethers such as tetrahydrofuran, dioxane, propylene glycol monoethyl ether acetate; dimethyl formamide; and dimethyl sulfoxide.

Moreover, it is preferred that the film is further subjected to annealing after the immersion or coating.

A temperature for the annealing is preferably 50° C. to 200° C., more preferably 60° C. to 180° C., and even more preferably 70° C. to 160° C.

When the temperature is lower than 50° C., crystallization or crosslinking reaction of polyvinyl alcohol is not accelerated by annealing, and thus it may not be able to attain water resistance. When the temperature is higher than 200° C., the hydrophilic polymer may be decomposed.

The crystalline polymer microporous membrane can be applied for various uses, but is particularly preferably used as a filtration filter, which will be explained hereinafter.

(Filtration Filter)

A filtration filter contains the aforementioned crystalline polymer microporous membrane.

When the crystalline polymer microporous membrane is used for a filtration filter, filtration is carried out with the first surface (i.e. the unheated surface) having the larger average pore diameter facing the inlet side. In other words, the surface having the large pore size is used as the filtration surface of the filter. By carrying out filtration using the first surface (i.e. the unheated surface) having the larger average pore diameter for the inlet side, it is possible to efficiently trap fine particles.

Also, since the crystalline polymer microporous membrane of the present invention has a large specific surface area, fine particles introduced from its front surface can be removed by adsorption or adhesion before reaching a portion with the smallest pore diameter. Therefore, the filter hardly allows clogging to arise and can sustain high filtration efficiency for a long period of time.

The filter is capable of filtration at least at a rate of 5 L/m²·min or higher, when the filtration is carried out at a differential pressure of 0.1 kg/cm².

Examples of the form of the filter include a pleated form in which a filtration membrane is corrugated, a spiral form in which a filtration membrane is continuously wound, a frame and plate form in which disc-shaped filtration membranes are stacked on top of one another, and a tube form in which a filtration membrane is formed as a tube. Among these, a pleated form is particularly preferable in that the effective surface area used for filtration per cartridge can be increased.

Filter cartridges are classified into element exchange type filter cartridges in which only filter elements are replaced when filtration membranes having been degraded need to be replaced, and capsule-type filter cartridges in which filter elements are provided integrally with filtration housings and both the filter elements and the housings are used in a disposable manner.

Figure 1:
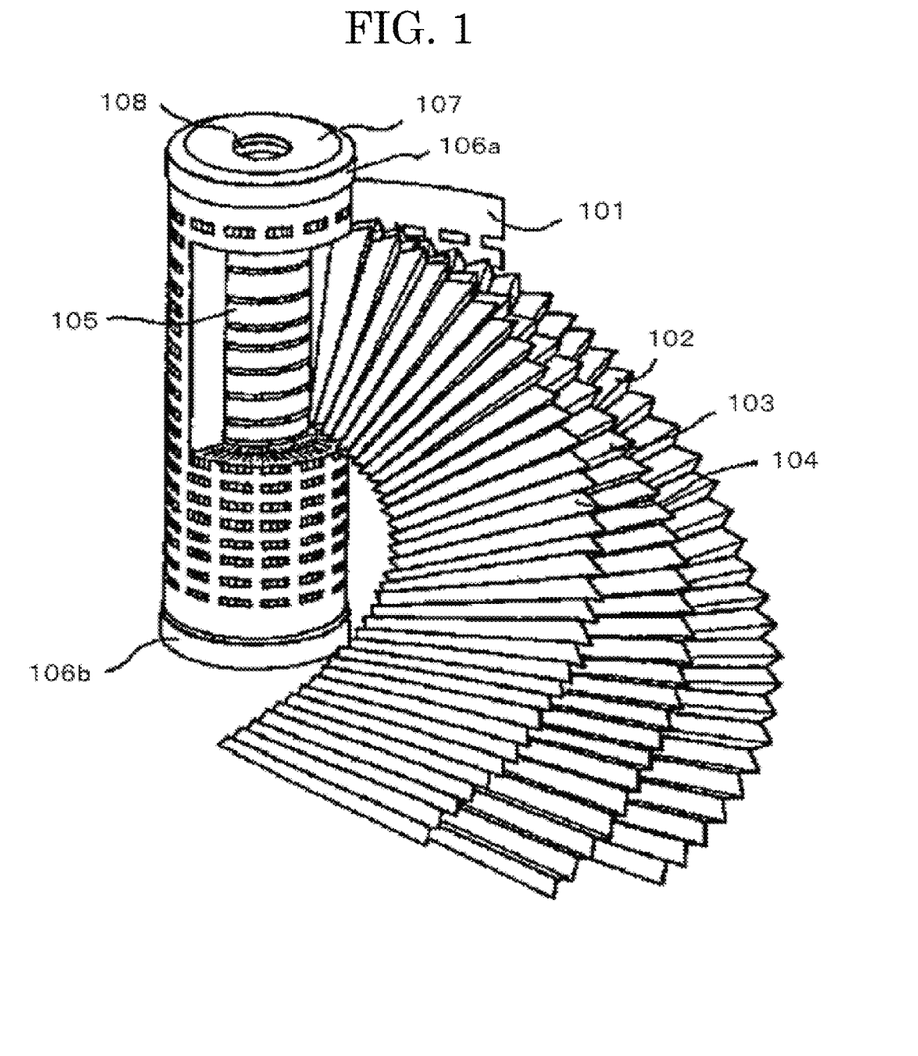
FIG. 1 is a view illustrating the structure of an ordinary pleated filter element before mounted in a housing.

FIG. 1 is a developed view showing the structure of an element exchange type pleated filter cartridge element. Sandwiched between two membrane supports 102 and 104, a microfiltration membrane 103 is corrugated and wound around a core 105 having multiple liquid-collecting slots, and a cylindrical object is thus formed. An outer circumferential cover 101 is provided outside the foregoing members so as to protect the microfiltration membrane. At both ends of the cylindrical object, the microfiltration membrane is sealed with end plates 106a and 106b. The end plates are connected to a sealing portion of a filter housing (not shown), with a gasket 107 placed in between. A filtered liquid is collected through the liquid-collecting slots of the core and discharged from a fluid outlet 108.

Figure 2:
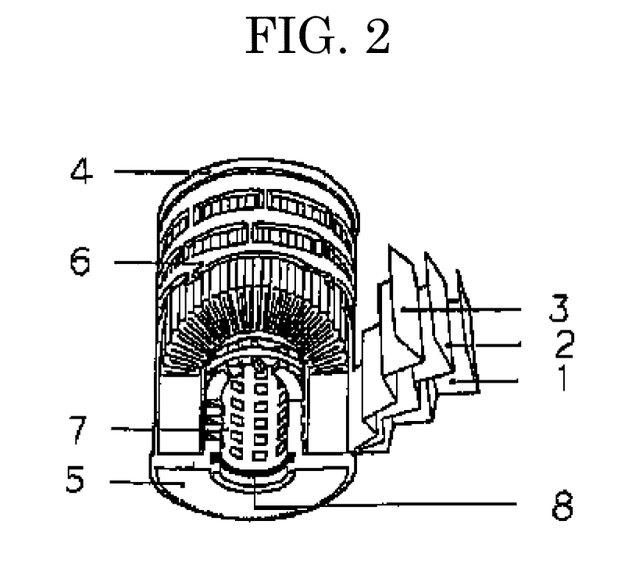
FIG. 2 is a view illustrating the structure of an ordinary filter element before mounted in a housing of a capsule-type filter cartridge
Figure 3:
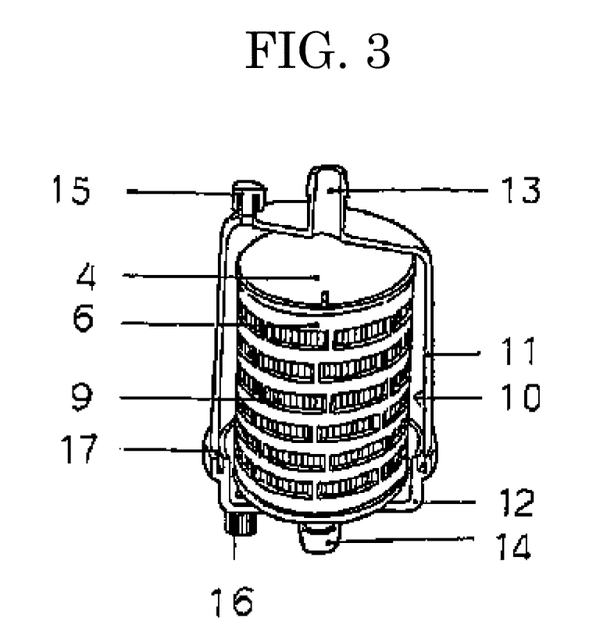
FIG. 3 is a view illustrating a structure of an ordinary capsule-type filter cartridge formed integrally with a housing.

Capsule-type pleated filter cartridges are shown in FIGS. 2 and 3.

FIG. 2 is a developed view showing the overall structure of a microfiltration membrane filter element before installed in a housing of a capsule-type filter cartridge. Sandwiched between two supports 1 (primary support) and 3 (secondary support), a microfiltration membrane 2 is corrugated and wound around a filter element core 7 having multiple liquid-collecting slots, and a cylindrical object is thus formed. A filter element cover 6 is provided outside the foregoing members so as to protect the microfiltration membrane. At both ends of the cylindrical object, the microfiltration membrane is sealed with an upper end plate 4 and a lower end plate 5.

FIG. 3 shows the structure of a capsule-type pleated filter cartridge in which the filter element has been installed in a housing so as to form a single unit. A filter element 10 is installed in a housing composed of a housing base 12 and a housing cover 11. The lower end plate is connected in a sealed manner to a water-collecting tube (not shown) at the center of the housing base by means of an O-shaped ring 8. A liquid enters the housing from a liquid inlet nozzle 13 and passes through a filter medium 9, then the liquid is collected through the liquid-collecting slots of the filter element core 7 and discharged from a liquid outlet nozzle 14. In general, the housing base and the housing cover are thermally fused in a liquid-tight manner at a fusing portion 17.

FIG. 2 shows an instance where the lower end plate and the housing base are connected in a sealed manner by means of the O-shaped ring. It should be noted that the lower end plate and the housing base may be connected in a sealed manner by thermal fusing or with an adhesive. Also, the housing base and the housing cover may be connected in a sealed manner with an adhesive as well as by thermal fusing. FIGS. 1 to 3 show specific examples of microfiltration filter cartridges, and note that the present invention is not confined to the examples shown in these drawings.

Note that, in FIG. 3, "15" represents an air bent, and "16" represents a drain.

Having a high filtering function and long lifetime as described above, the filter using the crystalline polymer microporous membrane of the present invention enables a filtration device to be compact. In a conventional filtration device, multiple filtration units are used in parallel so as to offset the short filtration life; use of the filter of the present invention for filtration makes it possible to greatly reduce the number of filtration units used in parallel. Furthermore, since it is possible to greatly lengthen the period of time for which the filter can be used without replacement, it is possible to cut costs and time necessary for maintenance.

The filter of the present invention for filtration can be used in a variety of situations where filtration is required, notably in microfiltration of gases, liquids, etc. For instance, the filter can be used for filtration of corrosive gases and gases for use in the semiconductor industry, and filtration and sterilization of cleaning water for use in the electronics industry, water for medical uses, water for pharmaceutical production processes and water for foods and drinks. It should be particularly noted that since the filter of the present invention is superior in heat resistance and chemical resistance, the filter can be effectively used for high-temperature filtration and filtration of reactive chemicals, for which conventional filters cannot be suitably used.

EXAMPLES

Examples of the present invention will be explained hereinafter, but these examples shall not be construed as limiting the scope of the present invention.

Example 1

<Production of Crystalline Polymer Porous Film>
—Preparation of Semi-Baked Film—

To 100 parts by mass of tetrafluoroethylene fine powder having a number average molecular weight of 6,200,000 (POLYFLON fine powder F104U, manufactured by DAIKIN INDUSTRIES, LTD), 27 parts by mass of hydrocarbon oil (ISOPAR manufactured by Esso Sekiyu K. K.) was added as an extrusion aid, and the obtained paste was extruded in the shape of a rod. The extruded paste was subjected to calendering at the speed of 50 m/min. by a calender roller heated at 70° C. to thereby prepare a polytetrafluoroethylene film. This film was then placed in a hot air drying oven having the temperature of 250° C. to dry and remove the extrusion aid, to thereby prepare an unbaked polytetrafluoroethylene film having an average thickness of 100 µm, average width of 150 mm, and specific gravity of 1.55.

A first surface (a heating surface) of the obtained unbaked polytetrafluoroethylene film was heated by a roller (surface material: SUS316) heated at 345° C. for 1 minute, to thereby prepare a semi-baked film.

The obtained semi-baked film was then drawn in the length direction by 12.5 times at the temperature of 270° C., then the drawn film was wound up with a winding roller. Thereafter, the film was pre-heated at 305° C., following by being drawn in the width direction by 30 times at the temperature of 270° C. with both ends thereof be pinched by clips. The drawn film was then heat set at 380° C. The extension rate of the drawn film was 260 times in terms of the area.
—Hydrophilization—

The drawn film was impregnated with ethanol, then immersed in a 1.0% by mass PVA (RS2117, manufactured by Kuraray Co., Ltd., having a molecular weight of 74,800) solution. The film taken out from the solution was subjected to annealing at 150° C. for 10 minutes in the atmosphere. The film was immersed and washed in boiling water for 30 minutes, then dried, to thereby obtain a crystalline polymer microporous membrane of Example 1, formed of a hydrophilic polytetrafluoroethylene asymmetric film.

Example 2

<Production of Crystalline Polymer Porous Film>

A crystalline polymer microporous membrane of Example 2 was obtained in the same manner as in Example 1, provided that the hydrophilization process was changed as follows.
—Hydrophilization—

The drawn film was impregnated with ethanol, then immersed in a 1.0% by mass PVA (RS2117, manufactured by Kuraray Co., Ltd.) solution. The film taken out from the solution was immersed in an ethylene glycol diglycidyl ether solution (2.0 wt %/KOH0.20%) serving as a crosslinking agent, then subjected to annealing at 150° C. for 10 minutes in the atmosphere. The film was immersed and washed in boiling water for 30 minutes, then dried, to thereby obtain a crystalline polymer microporous membrane of Example 2, formed of a hydrophilic polytetrafluoroethylene asymmetric film.

Example 3

<Production of Crystalline Polymer Porous Film>

A crystalline polymer microporous membrane of Example 3 was obtained in the same manner as in Example 1, provided that the hydrophilization process was changed as follows.
—Hydrophilization—

The drawn film was impregnated with ethanol, then immersed in a 1.0% by mass PVA (RS2117, manufactured by Kuraray Co., Ltd.) solution. The film taken out from the solution was immersed in a 0.5% by weight diphenylmethane diisocyanate solution serving as a crosslinking agent, then subjected to annealing at 150° C. for 10 minutes in the atmosphere. The film was immersed and washed in boiling water for 30 minutes, then dried, to thereby obtain a crystalline polymer microporous membrane of Example 3, formed of a hydrophilic polytetrafluoroethylene asymmetric film.

Example 4

<Production of Crystalline Polymer Porous Film>

A crystalline polymer microporous membrane of Example 4 was obtained in the same manner as in Example 1, provided that the hydrophilization process was changed as follows.
—Hydrophilization—

The drawn film was impregnated with ethanol, then immersed in a 1.0% by mass gelatin (manufactured by Nippi, Inc.) solution, then subjected to annealing at 100° C. for 10 minutes in the atmosphere, to thereby obtain a crystalline polymer microporous membrane of Example 4, formed of a hydrophilic polytetrafluoroethylene asymmetric film.

Comparative Example 1

<Production of Crystalline Polymer Porous Film>

A crystalline polymer microporous membrane of Comparative Example 1 formed of hydrophilic polytetrafluoroethylene asymmetric film was obtained in the same manner as Example 1, provided that the hydrophilization process was omitted.

Comparative Example 2

A polytetrafluoroethylene microporous membrane (symmetrical film, manufactured by JGI, Co. Ltd.) was impregnated with ethanol, then immersed in a 1.0% by mass PVA (RS2117, manufactured by Kuraray Co., Ltd.) solution. The film taken out from the solution was subjected to annealing at 150° C. for 10 minutes in the atmosphere. The film was immersed and washed in boiling water for 30 minutes, then dried, to thereby obtain a crystalline polymer microporous membrane of Comparative Example 2, formed of a hydrophilic polytetrafluoroethylene symmetric film.

Comparative Example 3

A polytetrafluoroethylene microporous membrane (symmetrical film, manufactured by JGI, Co. Ltd.) was impregnated with ethanol, then immersed in a 1.0% by mass PVA (RS2117, manufactured by Kuraray Co., Ltd.) solution. The film taken out from the solution was immersed in an ethylene glycol diglycidyl ether solution (2.0 wt %/KOH0.20%) serving as a crosslinking agent, then subjected to annealing at 150° C. for 10 minutes in the atmosphere. The film was immersed and washed in boiling water for 30 minutes, then dried, to thereby obtain a crystalline polymer microporous membrane of Comparative Example 3, formed of a hydrophilic polytetrafluoroethylene symmetric film.

Comparative Example 4

A polytetrafluoroethylene microporous membrane (symmetrical film, manufactured by JGI, Co. Ltd.) was impregnated with ethanol, then immersed in a 1.0% by mass PVA (RS2117, manufactured by Kuraray Co., Ltd.) solution. The film taken out from the solution was immersed in a 0.5 wt % diphenylmethane diisocyanate solution serving as a crosslinking agent, then subjected to annealing at 150° C. for 10 minutes in the atmosphere. The film was immersed and washed in boiling water for 30 minutes, then dried, to thereby obtain a crystalline polymer microporous membrane of Comparative Example 4, formed of a hydrophilic polytetrafluoroethylene symmetric film.

Comparative Example 5

<Production of Crystalline Polymer Porous Film>
A crystalline polymer microporous membrane of Comparative Example 5, formed of a hydrophilic polytetrafluoroethylene asymmetric film was obtained in the same manner as in Example 1, provided that the hydrophilization process was changed as follows.
—Hydrophilization—
The drawn film was impregnated with ethanol, then immersed in a 0.03% by mass hydrogen peroxide solution (liquid temperature: 40° C.). The film was taken out from the solution 20 hours later. Then, ArF excimer laser light (193 nm) was applied to the film from the upper side thereof, at the fluence of 25 mJ/cm$^2$/pulse, exposure dose of 10 J/cm$^2$. In such manner, a crystalline polymer microporous membrane of Comparative Example 5, formed of a hydrophilic polytetrafluoroethylene asymmetric film was obtained.

Comparative Example 6

<Production of Crystalline Polymer Porous Film>
A crystalline polymer microporous membrane of Comparative Example 6, formed of a hydrophilic polytetrafluoroethylene asymmetric film was obtained in the same manner as in Comparative Example 5, provided that the 0.03% by mass hydrogen peroxide solution was replaced with a 0.179% by mass methylethyle ketone solution.
<Evaluation on Hydrophilicity>
The crystalline polymer microporous membranes of Examples 1 to 4 and Comparative Examples 1 to 6 were evaluated in terms of hydrophilicity.

The evaluation for hydrophilicity was carried out with reference to the evaluation method disclosed in Japanese Patent (JP-B) No. 3075421. Specifically, a droplet of water was dropped onto a surface of a sample from the height of 5 cm, and the time required for the sample to absorb the droplet was measured. The measurement results were evaluated based on the evaluation criteria presented below. The results are shown in Table 1.
A: Absorbed within 1 second.
B: Naturally absorbed.
C: Absorbed only when pressure was applied, or not absorbed though the contact angle was reduced.
D: Not absorbed, i.e. repelling water.

Note that, the state of D is a property a porous fluororesin material (polytetrafluoroethylene) has, and shows that the film does not have hydrophilicity.
<Filtering Test>
A filtering test was performed on the crystalline polymer microporous membranes of Examples 1 to 4, and Comparative Examples 1 to 6.

A test solution containing 0.01% by mass of polystyrene latex (average particle size of 1.5 μm) was filtered through each of the films of Examples 1 to 4, and Comparative Examples 1 to 6, with a differential pressure of 10 kPa, and an amount of the solution filtered until the filter was clogged was measured. The results are shown in Table 1.

TABLE 1

|  | Hydrophilicity | Filtering test [mL/cm$^2$] |
| --- | --- | --- |
| Example 1 | B | 120 |
| Example 2 | A | 198 |
| Example 3 | A | 187 |
| Example 4 | A | 105 |
| Comparative Example 1 | D | NA |
| Comparative Example 2 | B | 31 |
| Comparative Example 3 | A | 68 |
| Comparative Example 4 | A | 54 |
| Comparative Example 5 | C | 13 |
| Comparative Example 6 | C | 15 |

Note that, the evaluation result presented as "NA" in Table 1 means that the test solution could not be filtered through the film.

From the results on hydrophilicity of the films shown in Table 1, it was found that the crystalline polymer microporous membranes of Examples 1 to 4 and Comparative Examples 2 to 4 had hydrophilicity, the crystalline polymer microporous membrane of Comparative Example 1 did not have hydrophilicity at all, and the crystalline polymer microporous membranes of Comparative Examples 5 and 6 had only slight hydrophilicity.

Regarding the results of the filtering test shown in Table 1, the amount of the test solution could not measured with the crystalline polymer microporous membrane of Comparative Example 1 as the crystalline polymer microporous membrane of Comparative Example 1 did not have hydrophilicity. All the crystalline polymer microporous membranes of Comparative Examples 2 to 6 had the results such that the amount of the test solution filtered did not exceed 100 mL/cm$^2$.

In contrast, the crystalline polymer microporous membranes of Examples 1 to 4 had the results showing the amount thereof equal to or more than 100 mL/cm$^2$, significantly improving the lifetime of the filter (the filtration flow rate).

Note that, the filtering test was performed on the films to which a pre-hydrophilization treatment using isopropanol was not given for hydrophilization. From the results of the filtering test, it was found that the crystalline polymer microporous membranes of Examples 1 to 4 achieved long filter lifetime (high filtration flow rate) due to the properties of the films.
<Evaluation on Water Resistance>
Water (200 mL) was passed through each of the crystalline polymer microporous membranes of Examples 1 to 4, and Comparative Examples 1 to 6 at the pressure of 100 kPa. This process was carried out 5 times, and the film was dried after every time water was passed through the film.

Water resistance of the crystalline polymer microporous membranes of Examples 1 to 4, and Comparative Examples 1 to 6 were each evaluated by evaluating the films after the aforementioned procedure based on the evaluation criteria (A to D) used for the evaluation for the hydrophilicity. The results are shown in Table 2 below.

<Evaluation on Acid Resistance>

Acid resistance of the crystalline polymer microporous membranes of Examples 1 to 4, and Comparative Examples 1 to 6 was evaluated by immersing each film in a 1N hydrochloric acid solution having the temperature of 80° C. for 5 hours, then evaluating the film based on the evaluation criteria (A to D) used for the evaluation for the hydrophilicity. The results are shown in Table 2 below.

<Evaluation on Alkali Resistance>

Alkali resistance of the crystalline polymer microporous membranes of Examples 1 to 4, and Comparative Examples 1 to 6 was evaluated by immersing each film in a 1N sodium hydroxide solution having the temperature of 80° C. for 5 hours, then evaluating the film based on the evaluation criteria (A to D) used for the evaluation for the hydrophilicity. The results are shown in Table 2 below.

TABLE 2

| | Water resistance | Acid resistance | Alkali resistance |
|---|---|---|---|
| Example 1 | B | C | C |
| Example 2 | A | A | A |
| Example 3 | A | C | B |
| Example 4 | D | C | C |
| Comparative Example 1 | NA | NA | NA |
| Comparative Example 2 | C | D | D |
| Comparative Example 3 | A | A | A |
| Comparative Example 4 | A | C | C |
| Comparative Example 5 | NA | NA | NA |
| Comparative Example 6 | NA | NA | NA |

Note that, in Table 2, "NA" means that the evaluation could not be carried out because of poor hydrophilicity.

As shown in Table 2, the crystalline polymer microporous membranes of Example 1 and Comparative Example 2, on which a crosslinking treatment had not been performed using a crosslinking agent, did not have sufficient water resistance, acid resistance and alkali resistance. Moreover, the crystalline polymer micoporous films of Example 3 and Comparative Example 4, on which the isocyanate crosslinking treatment had been performed using the crosslinking agent, did not have sufficient acid resistance and alkali resistance.

On the other hand, the crystalline polymer microporous membranes of Example 2 and Comparative Example 3, on which the ether crosslinking treatment had been performed using the crosslinking agent, had excellent acid resistance and alkali resistance.

Moreover, the crystalline polymer microporous membranes of Examples 1 to 3 using polyvinyl alcohol as a hydrophilic polymer had excellent water resistance.

<Evaluation on Shape by SEM>

An average pore diameter of a crystalline polymer microporous membrane can be measured by observing the film under an electron microscope, such as SEM.

The crystalline polymer microporous membranes of Example 1 and Comparative Example 1 were each cut along the length direction thereof, and a cross-section thereof was observed by SEM.

The shape on each cross-section is explained with reference to the schematic diagrams shown in FIGS. 4A and 4B, for better understanding.

Figure 4A:
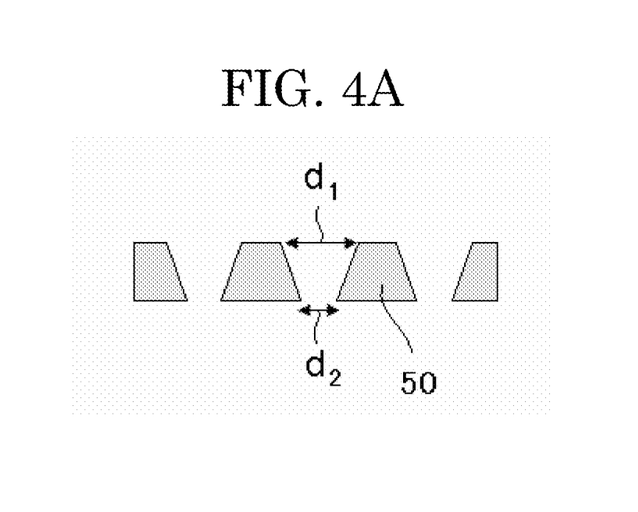
FIG. 4A is a schematic view illustrating a cross-section of the crystalline polymer microporous membrane of Comparative Example 1.

FIG. 4A is a diagram schematically illustrating a cross-section of the crystalline polymer microporous membrane of Comparative Example 1. Assuming that an (average) pore diameter on a first surface (unheated surface) of the film was $d_1$, and that on the second surface (heated surface) was $d_2$, a ratio $d_1/d_2$ of $d_1$ to $d_2$ was 15 on the SEM image.

Figure 4B:
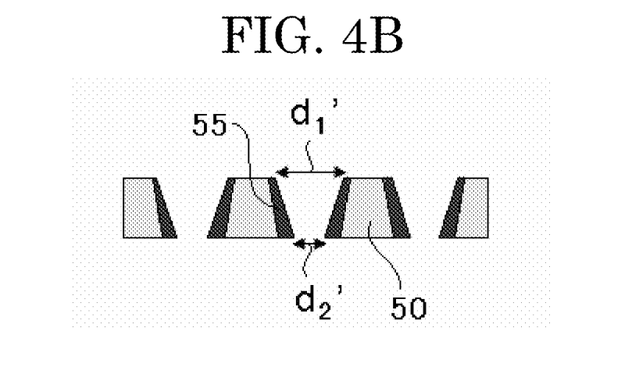
FIG. 4B is a schematic view illustrating a cross-section of the crystalline polymer microporous membrane of Example 1.

FIG. 4B is a diagram schematically illustrating a cross-section of the crystalline polymer microporous membrane of Example 1. Assuming that an (average) pore diameter on a first surface (unheated surface) of the film was $d_1'$, and that on the second surface (heated surface) was $d_2'$, a ratio $d_1'/d_2'$ of $d_1'$ to $d_2'$ was 18 on the SEM image.

As seen from the comparison between the ratios, $d_1'/d_2'(=18)$ obtained in the crystalline polymer microporous membrane of Example 1 and $d_1/d_2(=15)$ obtained in the crystalline polymer microporous membrane of Comparative Example 1, the crystalline polymer microporous membrane of Example 1 had the larger difference (large ratio) between the average pore diameter on the first surface (unheated surface) and that on the second surface (heated surface) compared to the case of the crystalline polymer microporous membrane of Comparative Example 1.

This surprising result was not expected before the observation of the SEM images. It is probably because the average pore diameter of the crystalline polymer 50 continuously changes from the first surface to the second surface, and the thickness of the hydrophilic coated portion 55 after the hydrophilization treatment using a hydrophilic polymer continuously reduces from the first surface to the second surface.

Based on this result, it was found that the crystalline polymer microporous membrane of Example 1 could improve a filter lifetime (filtration flow rate) by preventing clogging, as the film had excellent hydrophilicity and had a large difference between the average pore diameter on the first surface (unheated surface) and that on the second surface (heated surface).

Example 5

—Formation of Filter Cartridge (Filtration Filter)—

The crystalline polymer microporous membrane of Example 1 was placed in between two pieces of polypropylene nonwoven fabrics, pleated so as to have a pleat width of 10.5 mm, and provided with 138 folds and formed into a cylindrical shape. The joint was used using an impulse sealer so as to form a cylindrical object. Both ends of the cylindrical object were cut by 2 mm each, and the cut surfaces were thermally fused with polypropylene end plates so as to prepare an element exchange type filter cartridge, to thereby produce a filtration filter of Example 5.

Since the filtration filter (filter cartridge) of Example 5 used the hydrophilic crystalline polymer microporous membrane, no complicated pre-hydrophilization treatment of an aqueous treatment was necessary, and the filter cartridge had excellent solvent resistance. Also, since pores in the crystalline polymer microporous membrane were asymmetrically formed, the flow rate was high, clogging hardly arose and a long lifetime was yielded.

The aforementioned crystalline polymer microporous membrane and filtration filter using the crystalline polymer microporous membrane are capable of efficiently trapping fine particles for a long period of time, which improves abrasion resistance in particle trapping ability, and superior in heat resistance and chemical resistance, so that they can be used in a variety of situations where filtration is required, notably in microfiltration of gases, liquids, etc. For instance, the crystalline polymer microporous membrane and the filtration filter can be widely used for filtration of corrosive gases and gases for use in the semiconductor industry, filtration and sterilization of cleaning water for use in the electronics industry, water for medical uses, water for pharmaceutical production processes and water for foods and drinks, high-temperature filtration and filtration of reactive chemicals.

What is claimed is:

1. A crystalline polymer microporous membrane, comprising:
    a microporous film formed of a crystalline polymer, which has a plurality of pores; and
    a hydrophilic polymer containing a hydroxyl group, which covers exposed surfaces of the microporous film,
    wherein the plurality of pores have a larger average pore diameter at a first surface of the film than the average pore diameter at a second surface of the film, the average pore diameter of the pores continuously changes from the first surface to the second surface, the saponification value of the hydrophilic polymer is 50 to 100, and the hydrophilic polymer is crosslinked with a crosslinking agent which is a polyfunctional epoxy compound.

2. The crystalline polymer microporous membrane according to claim 1, wherein the microporous film is a film obtained by heating a first surface of a film formed of a crystalline polymer so as to form a semi-baked film with a temperature gradient in the thickness direction thereof, and drawing the semi-baked film.

3. The crystalline polymer microporous membrane according to claim 2, wherein the second surface is a heated surface.

4. The crystalline polymer microporous membrane according to claim 1, wherein the crystalline polymer is polytetrafluoroethylene.

5. The crystalline polymer microporous membrane according to claim 1, wherein the hydrophilic polymer containing a hydroxyl group is polyvinyl alcohol.

6. A filtration filter, comprising:
    a crystalline polymer microporous membrane, which comprises:
    a microporous film formed of a crystalline polymer, which has a plurality of pores; and
    a hydrophilic polymer containing a hydroxyl group, which covers exposed surfaces of the microporous film,
    wherein the plurality of pores have a larger average pore diameter at a first surface of the film than the average pore diameter at a second surface of the film, the average pore diameter of the pores continuously changes from the first surface to the second surface, the saponification value of the hydrophilic polymer is 50 to 100, and the hydrophilic polymer is crosslinked with a crosslinking agent which is a polyfunctional epoxy compound.

7. The filtration filter according to claim 6, wherein the crystalline polymer microporous membrane has a pleated shape.

8. The filtration filter according to claim 6, wherein the first surface of the microporous film is a filtering surface from which a fluid to be filtered is introduced.

* * * * *